March 27, 1934.  DE LOSS K. MARTIN  1,952,879
DIRECTION FINDING SYSTEM
Filed Nov. 27, 1931
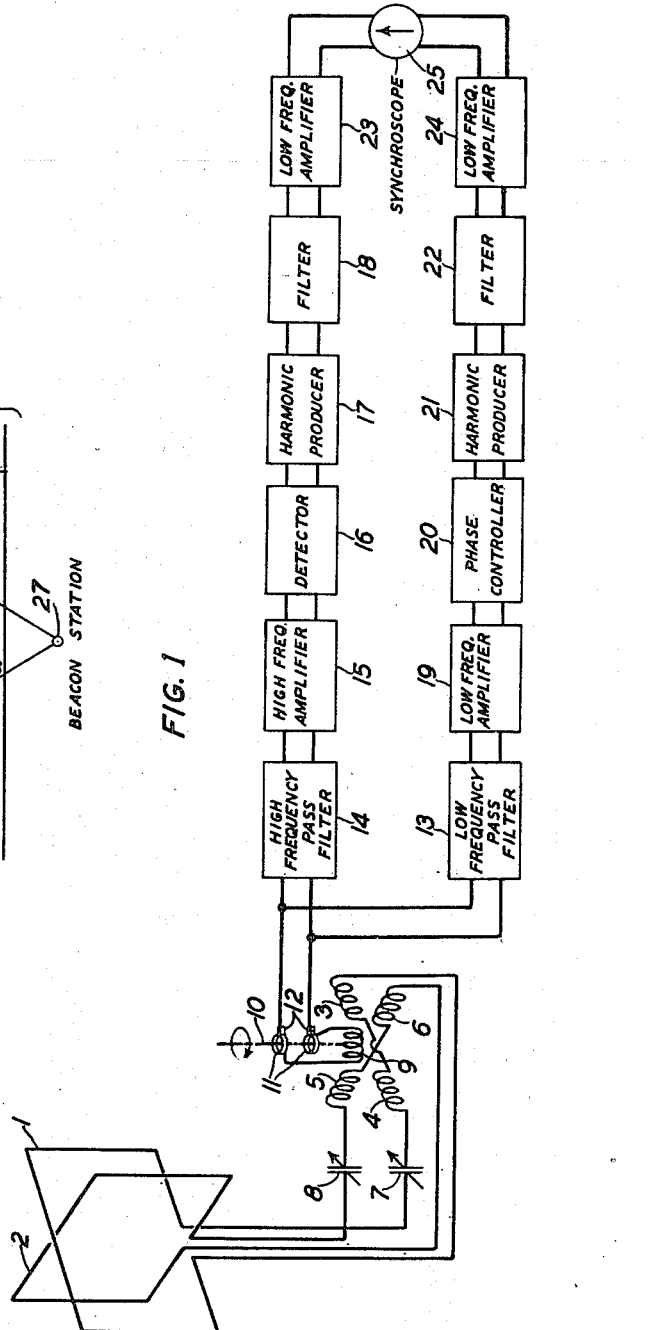
INVENTOR
D. K. MARTIN
BY
E. V. Griggs
ATTORNEY Patented Mar. 27, 1934

1,952,879

UNITED STATES PATENT OFFICE 1,952,879

DIRECTION FINDING SYSTEM

De Loss K. Martin, West Orange, N. J., assignor to Bell Telephone Laboratories, Incorporated, New York, N. Y., a corporation of New York Application November 27, 1931, Serial No. 577,642

11 Claims. (Cl. 250—11)

This invention relates to navigational systems and more particularly to radio navigational systems.

Various systems and methods of navigating ships and aircrafts involving the use of radio beacons are employed at the present time some of which require the periodic computation of bearings for the purpose of ascertaining drift and other factors tending to cause the object navigated to deviate from a particular course; and others of which, such as the so-called "homing" system, depend upon periodic adjustments in the heading of the object for the purpose of maintaining a particular course to the beacon. In the first mentioned class of systems a particular straight course may be maintained by correctly computing drift and other factors, in the second class the object actually follows a curved course to the beacon if forces causing drift are acting upon the object.

It is one object of this invention to maintain a mobile station on a straight course to a given destination without continually taking bearings.

It is another object of this invention to navigate an aircraft over a particular true course, such as an established airway, in a simple and accurate manner.

It is still another object of this invention to determine automatically at the mobile station the direction to a radio beacon.

In accordance with one feature of the invention automatic compensation for drift is effected. Another feature is that the pilot need observe only only indicator in maintaining his course. Still another feature of the invention is that the ordinary swinging or yawing of the aircraft will not affect the meter reading.

In one embodiment of the invention a radio goniometer is employed at the mobile receiving station, the goniometer comprising two crossed loops rigidly positioned at right angles to each other, two stator coils also positioned at right angles to each other, each being associated with one of the loops, and a search coil continuously rotating in the field of the stator coils. Two alternating currents, each a function of the speed of rotation, are produced in the rotating coil since the magnetic field of the earth and the field established by the stator coils are traversed by the rotating coil. These two distinct currents are separated by suitable filtering means and amplified, and the phase relation of equal frequency current components derived from the two original currents is determined by means of a phase-meter. The phase difference corresponds to the angle between the direction of the earth's magnetic field and the direction of the beacon field. The pilot navigating the mobile station determines his position with respect to the beacon station and then follows a straight course toward the beacon station by maintaining the phase-meter reading, and hence the angle mentioned above, constant. Any change in heading for the purpose of compensating for drift or other factors will affect the absolute phase of both currents equally and consequently will not affect the phase difference.

The invention will be more fully understood from the following description taken in connection with the drawing in which:

Fig. 1 illustrates one embodiment of the invention comprising a receiving system located at the mobile station; and Fig. 2 is a diagrammatic representation of the earth's magnetic field and the radio beacon field, which is useful in explaining the operation of the system of Fig. 1.

Referring to Fig. 1 reference numerals 1 and 2 designate the crossed loops of a radio goniometer which are rigidly positioned at a mobile station, such as an aircraft, at right angles to each other. The numerals 3 and 4 denote inductance coils connected in series between the terminals of loops 1 and numerals 5 and 6 denote serially connected inductance coils included between the terminals of loop 2, the pair comprising coils 3 and 4 being positioned at right angles to the pair comprising coils 5 and 6. Numerals 7 and 8 designate tuning condensers connected, respectively, in series with loops 1 and 2; and numeral 9 designates a search coil which is rotated continuously by shaft 10 in the resultant field of coils 3, 4, 5 and 6, the motor driving the shaft 10 not being shown on the drawing for the sake of simplicity. The terminals of coil 9 are connected to slip rings 11 which in turn are associated with the brushes 12.

Reference numerals 13 and 14 designate, respectively, a low frequency pass filter and a high frequency pass filter, the input terminals of each of which are connected to brushes 12. A radio frequency amplifier designated by numeral 15 is connected between the output terminals of filter 14 and the input terminals of a detector 16, the output terminals of which are associated with a harmonic producer 17. This harmonic producer is connected to a filter 18 which is designed to pass a certain frequency or a certain narrow band of frequencies. Reference numeral 19 designates a low frequency amplifier which is included between the output terminals of filter 13 and the input terminals of a phase controller 20. The phase controller is connected to a harmonic producer 21 which in turn is associated with a filter 22 designed to pass the same frequency or frequencies as filter 18. The output terminals of filters 18 and 22 are connected through low frequency amplifiers 23 and 24, respectively, to different windings of the synchroscope 25. Obviously other types of synchroscopes, such as a cathode ray tube type, may be employed.

The operation of the system shown in Fig. 1 may be briefly described as follows: The crossed loops 1 and 2 are tuned, respectively, by means of adjustable condensers 7 and 8 to waves emanating from a particular beacon station which may be either a directive or a non-directive station such as a broadcast station, and the received waves produce oscillating currents in these loops. The intensities of these currents depend upon the angles formed by the direction of the beacon station and the plane of each loop. One current flows through coils 3 and 4 and the other through coils 5 and 6, and they produce two component magnetic fields which compose themselves into a sole resultant field. The coil 9, rotating at a uniform speed, traverses this field and the resulting high frequency current produced in this coil is modulated by a low frequency current having a frequency substantially equal to twice the speed of rotation. The high frequency current is collected by means of slip rings 11 and brushes 12 and supplied through high frequency pass filter 14 to the input of amplifier 15. The earth's magnetic field is also traversed by coil 9 and the resulting low frequency current, the frequency of which is equal to the speed of rotation, is supplied through low frequency pass filter 13 to amplifier 19. The high frequency pass filter 14 prevents the low frequency from passing to amplifier 15 and the low frequency pass filter 13 blocks the flow of high frequency current to amplifier 19. It is important to note that the absolute phases of the low frequency current produced by the earth's magnetic field and of the low frequency current modulating the high frequency current are directly related, respectively, to the direction of the earth's magnetic field and the direction of the radio beacon field.

The high frequency current is amplified in high frequency amplifier 15 and then detected in detector 16. The low frequency component in the output of detector 16 is supplied among other components to the input of harmonic producer 17. In a similar manner the low frequency current from filter 13 is amplified in low frequency amplifier 19 and supplied through phase controller 20 to the harmonic producer 21. Substantially only harmonics of the same predetermined single frequency in the output of producers 17 and 21 are transmitted through filters 18 and 22 to amplifiers 23 and 24, respectively, and impressed on the stator and rotor windings of the synchroscope 25. The phase difference as indicated by the synchroscope 25 is the same as the phase difference between the corresponding low frequency variations in the received high frequency wave and the low frequency current produced by the earth's magnetic field and is therefore a measurement of the angle between the direction of the earth's magnetic field and the direction of the beacon field. The sensitivity of the measurement is determined by the harmonic of the fundamental earth current employed. For example, if the second harmonic from producer 21 be employed and if the mobile station deviates ten degrees from the course, the synchroscope will show a twenty degree reading. If the fourth harmonic be employed the synchroscope will read forty degrees for the same deviation.

The phase of the low frequency current derived from the earth's magnetic field may be varied by means of the phase controller 20 for the purpose of obtaining a zero reading on the synchroscope for a given course. Obviously, the phase controller 20 may be included between amplifier 15 and detector 16; or two phase controllers, one associated with amplifier 15 and the other with amplifier 19, may be employed for accomplishing this result.

Referring to Fig. 2 the lines of the earth's magnetic field which are substantially parallel over a particular area of the earth are represented by the parallel lines 26 and the radial lines of the field of transmitting station 27 are shown by the lines 28. Considering one of the lines 28 as, for example, the line on the left, it will be seen that the angle between this course to or from the station 27 and the earth's magnetic field is the same at all points along the course. Assuming that an aircraft is being guided toward the beacon station the phase indication of the synchroscope will remain constant as long as the mobile station remains on its particular course. When the course is changed a phase change will occur in the currents in one or both of the branch circuits and this change will be indicated by a synchroscope. It is important to note, however, that a change in the heading of the aircraft, such as may be made by heading the craft into the wind for the purpose of compensating for drift, will not cause a change in the deflection of the phase indicator as long as the aircraft continues to follow the correct course. This is due to the fact that the absolute phases of the currents in both windings of the synchroscope change by the same amount, and in the same direction, so that their difference remains the same. Consequently the repeated corrections that would otherwise have to be made for varying rates of drift are eliminated in this system.

Before setting his course the pilot observes the phase difference as indicated by the synchroscope for the purpose of determining the bearing of the mobile station with respect to the beacon station. Thus, assuming that the second harmonic from the harmonic producer 21 is used and that a two-to-one gear reduction is associated with the synchroscope pointer, and also that a zero phase difference indicates that the mobile station is north of the beacon, it is clear that a 90° difference, a 180° difference and a 270° difference will indicate, respectively, that the mobile station is east, south and west of the beacon station. The pilot is enabled therefore to set his course toward, or away from, if he so chooses, the beacon station. Having once set his course toward the beacon station he may for convenience adjust the phase controller to give zero reading on the synchroscope and then by maintaining the reading constant follow a straight course to the beacon.

Although the invention has been described in connection with certain specific apparatus it is to be understood that it is not to be limited to such apparatus. Obviously other component parts and means may be successfully employed in practicing the invention without exceeding its scope.

What is claimed is:

1. In a radio receiving station, a first means comprising a rotating coil for obtaining an alternating current from a given radio field, a second means comprising said coil for obtaining an alternating current of the same frequency from the earth's field, and a means included between the first and second means for comparing the phases of said currents.

2. A radio receiving station comprising rotating means for obtaining a modulated current from a radio field and a current from the earth's magnetic field, a plurality of filtering means for separating said currents connected thereto, separate frequency producing means for obtaining equal frequency components connected to each filtering means, and means for indicating the phase relation of said components included between said frequency producing means.

3. In a navigating system, a coil positioned on the object to be navigated and arranged to rotate in a radio field, a plurality of filtering means for separating the currents produced in the coil by said field and by the earth's magnetic field connected thereto, separate frequency producing means for obtaining similar frequency components connected to each filtering means, and means for continuously indicating the phase relation of said components connected to the output terminal of the frequency producing means.

4. In a navigating system, a coil positioned on the craft to be navigated and arranged to rotate in a radio field and in the earth's field, a plurality of filtering means for separating said currents, each having their input terminals connected to the coil, separate frequency producing means connected to the output terminals of each filtering means for obtaining similar frequency components, a second plurality of filtering means each arranged to pass similar frequency components, and phase measuring means, one of the second plurality of filtering means being included between one of the frequency producing means and the phase measuring means and another of the second plurality of filtering means being included between the other frequency producing means and the phase measuring means.

5. In a navigating system, a coil positioned on the craft to be navigated and arranged to rotate in the field of a transmitting station, and in the earth's magnetic field, a high frequency pass filter, a low frequency pass filter, a plurality of harmonic producing means, and a phase-meter, said phase-meter having two of its terminals connected to the coil through the high frequency filter, and one of the harmonic producing means and its remaining two terminals connected to the coil through the low pass filter and another of the harmonic producing means.

6. In a navigating system, a coil positioned on the craft to be navigated and arranged to continuously rotate in the field of a transmitting station and in the earth's magnetic field, a high frequency pass filter, a low frequency pass filter, said filters having their input terminals connected to the coil, a detector connected to the high pass filter, a plurality of harmonic producers, one of which is connected to the detector and another of which is connected to the low pass filter, a plurality of filters each arranged to pass only currents of a similar predetermined frequency substantially, and a synchroscope, one of the plurality of filters being included between one of the harmonic producers and the synchroscope and another of the said filters being included between the other harmonic producer and the synchroscope.

7. In a navigating system, a coil positioned on the craft to be navigated and arranged to rotate continuously in a radio beacon field and in the earth's magnetic field, a high frequency pass filter, a low frequency pass filter, said filters having their input terminals connected to the coil, a detector connected to the output of the high frequency pass filter, a plurality of harmonic producers, a plurality of filters each arranged to pass current of the same frequency substantially, and a synchroscope having two windings, said synchroscope having one winding connected through one harmonic producer and one of the plurality of filters to said detector and having its other winding connected through another harmonic producer and another of the plurality of filters to the low pass filter.

8. In a navigating system, a radio goniometer positioned at the mobile station and tuned to waves from a beacon station, means for continuously rotating the search coil of said goniometer, a high frequency pass filter, a low frequency pass filter, means for maintaining the input terminals of said filters connected to the terminals of said coil, a detector connected to the output of the high pass filter, a plurality of harmonic producers one of which is connected to the output of the detector and another of which is connected to the low pass filter, a plurality of filters each arranged to pass currents of substantially the same frequency, and a synchroscope having one winding connected through one of the plurality of filters to the output terminals of one harmonic producer and having its other winding connected through another of the plurality of filters to the output terminals of the other harmonic producer, and a phase controller included between the synchroscope and one of the first mentioned filters.

9. In a navigating system for aircraft, a radio goniometer positioned on the aircraft and tuned for waves transmitted from a beacon station, means for continuously rotating the search coil of said goniometer, a high frequency pass filter, a low frequency pass filter, means for maintaining the input terminals of said filters connected to the terminals of said coil, a detector connected to the output of the high pass filter, a phase controller connected to the output of the low pass filter, a plurality of harmonic producers one of which is connected to the detector and another of which is connected to the phase controller, a plurality of filters each arranged to pass currents of substantially the same frequency, and a synchroscope, said synchroscope having one winding connected through one of the plurality of filters to the output terminals of one harmonic producer and having its other winding connected through another of the plurality of filters to the output terminals of the other harmonic producer.

10. The method of navigating an object along a straight course to or from a radio transmitting station which comprises obtaining at said object an alternating current from the station field and an alternating current of the same frequency from the earth's field and maintaining constant the phase relation of said currents during the movement of said object.

11. The method of navigating an object along a straight course to or from a radio transmitting station which comprises establishing at said object a field the direction of which depends upon the bearing of said object with respect to the station, obtaining an alternating current from the field and an alternating current of the same frequency from the earth's field and maintaining constant the phase relation of said currents during the movement of said object.

DE LOSS K. MARTIN.